(12) United States Patent
Clark et al.

(10) Patent No.: US 7,943,070 B1
(45) Date of Patent: *May 17, 2011

(54) MOLDED THIN-LAYER LIGNOCELLULOSE COMPOSITES HAVING REDUCED THICKNESS AND METHODS OF MAKING SAME

(75) Inventors: Randy Jon Clark, Klamath Falls, OR (US); Michael Jay Henry, Yakima, WA (US)

(73) Assignee: JELD-WEN, inc., Klamath Falls, OR (US)

( * ) Notice: Subject to any disclaimer, the term of this patent is extended or adjusted under 35 U.S.C. 154(b) by 756 days.

This patent is subject to a terminal disclaimer.

(21) Appl. No.: 10/839,639

(22) Filed: May 5, 2004

Related U.S. Application Data

(60) Provisional application No. 60/467,863, filed on May 5, 2003.

(51) Int. Cl.
  *B27N 3/00* (2006.01)
  *B29C 43/00* (2006.01)
  *B29C 33/40* (2006.01)
  *B29C 33/60* (2006.01)

(52) U.S. Cl. ........ 264/120; 264/109; 264/220; 264/300; 264/330

(58) Field of Classification Search ............... 428/292.1, 428/98, 174; 264/109
See application file for complete search history.

(56) References Cited

U.S. PATENT DOCUMENTS

| | | |
|---|---|---|
| 619,676 A | 2/1899 | Cronin |
| 670,939 A | 4/1901 | Rapp |
| 877,922 A | 2/1908 | Gager |
| 1,183,842 A | 5/1916 | Ailing |
| D132,040 S | 4/1942 | Cummings |
| 2,343,740 A | 3/1944 | Birmingham |
| 2,682,083 A | 6/1954 | Patton |
| 2,797,450 A | 7/1957 | Ropella |
| 2,831,793 A | 4/1958 | Elmendorf |
| 3,098,781 A | 7/1963 | Greten |
| 3,121,263 A | 2/1964 | Binner |
| 3,212,948 A | 10/1965 | McMahon |
| 3,308,013 A | 3/1967 | Bryant |
| 3,440,189 A | 4/1969 | Sharp et al. |
| 3,484,994 A | 12/1969 | Ashby et al. |
| 3,512,304 A | 5/1970 | Meuret |
| 3,533,190 A | 10/1970 | Hilfinger et al. |
| 3,546,841 A | 12/1970 | Smith et al. |
| 3,576,092 A | 4/1971 | Halpern |

(Continued)

FOREIGN PATENT DOCUMENTS

CA  57271  10/1986

(Continued)

OTHER PUBLICATIONS

U.S. Appl. No. 10/426,573, filed Aug. 30, 2003, G. A. Davina et al.

(Continued)

*Primary Examiner* — D. Lawremce Tarazano
*Assistant Examiner* — Camie Thompson
(74) *Attorney, Agent, or Firm* — Stoel Rives LLP

(57) ABSTRACT

Thin-layer lignocellulose composites having reduced thickness and methods for the manufacture of such thin-layer composites are disclosed. Also described is a process for making wood-based composite door skins of reduced thickness. The door skins may be less than 0.115 inches (2.92 mm) thick.

28 Claims, 2 Drawing Sheets

U.S. PATENT DOCUMENTS

| | | |
|---|---|---|
| 3,616,120 A | 10/1971 | Warwick |
| D222,775 S | 12/1971 | Sartori |
| 3,639,200 A | 2/1972 | Elmendorf et al. |
| 3,760,543 A | 9/1973 | McAllister |
| 3,773,587 A | 11/1973 | Flewwelling |
| 3,793,125 A | 2/1974 | Kunz |
| 3,796,586 A | 3/1974 | Hanlon et al. |
| 3,824,058 A | 7/1974 | Axer et al. |
| 3,899,860 A | 8/1975 | Newell |
| 3,919,017 A | 11/1975 | Shoemaker et al. |
| 3,987,599 A | 10/1976 | Hines |
| D244,736 S | 6/1977 | Palka |
| D245,824 S | 9/1977 | Palka |
| 4,072,558 A | 2/1978 | Akerson |
| 4,100,138 A | 7/1978 | Bilow et al. |
| 4,100,328 A | 7/1978 | Gallagher |
| 4,104,828 A | 8/1978 | Naslund et al. |
| 4,142,007 A | 2/1979 | Lampe et al. |
| 4,146,662 A | 3/1979 | Eggers et al. |
| 4,183,187 A | 1/1980 | Simard |
| 4,236,365 A | 12/1980 | Wheeler |
| 4,246,310 A | 1/1981 | Hunt et al. |
| 4,248,163 A | 2/1981 | Caughey et al. |
| 4,268,565 A | 5/1981 | Luck et al. |
| 4,277,428 A | 7/1981 | Luck et al. |
| D266,042 S | 9/1982 | Moore et al. |
| 4,350,543 A | 9/1982 | Bruguera |
| D266,720 S | 11/1982 | Moore et al. |
| 4,359,507 A | 11/1982 | Gaul et al. |
| 4,361,612 A | 11/1982 | Shaner et al. |
| 4,364,984 A | 12/1982 | Wentworth |
| 4,376,088 A | 3/1983 | Prather |
| 4,388,138 A | 6/1983 | Brown et al. |
| 4,396,673 A | 8/1983 | Ball et al. |
| 4,441,296 A | 4/1984 | Grabendike et al. |
| D274,107 S | 6/1984 | Gordon |
| D274,944 S | 7/1984 | Coppa |
| 4,503,115 A | 3/1985 | Hemels et al. |
| 4,544,440 A | 10/1985 | Wheeler |
| 4,550,540 A | 11/1985 | Thorn |
| 4,552,797 A | 11/1985 | Munk et al. |
| D282,426 S | 2/1986 | Heimberger et al. |
| 4,579,613 A | 4/1986 | Belanger |
| 4,610,900 A | 9/1986 | Nishibori |
| 4,610,913 A | 9/1986 | Barnes |
| D286,177 S | 10/1986 | Case et al. |
| 4,622,190 A | 11/1986 | Schultz |
| 4,643,787 A | 2/1987 | Goodman |
| D292,766 S | 11/1987 | Palka |
| 4,706,431 A | 11/1987 | Corvese |
| 4,720,363 A | 1/1988 | Mayumi et al. |
| 4,742,144 A | 5/1988 | Nguyen et al. |
| 4,781,876 A | 11/1988 | Kia |
| 4,811,538 A | 3/1989 | Lehnert et al. |
| 4,830,929 A | 5/1989 | Ikeda et al. |
| 4,853,062 A | 8/1989 | Gartland |
| 4,876,838 A | 10/1989 | Hagemeyer |
| D304,983 S | 12/1989 | Palka |
| 4,896,471 A | 1/1990 | Turner |
| 4,897,975 A | 2/1990 | Artwick et al. |
| 4,901,493 A | 2/1990 | Thorn |
| 4,908,990 A | 3/1990 | Yoon et al. |
| 4,914,844 A | 4/1990 | Seery |
| 4,942,081 A | 7/1990 | Reiniger |
| 4,942,084 A | 7/1990 | Prince |
| D311,957 S | 11/1990 | Hall |
| D314,242 S | 1/1991 | Mikolaitis |
| D314,625 S | 2/1991 | Hall |
| 5,008,359 A | 4/1991 | Hunter |
| 5,009,821 A | 4/1991 | Weaver |
| 5,016,414 A | 5/1991 | Wang |
| D319,884 S | 9/1991 | Hall |
| 5,074,087 A | 12/1991 | Green |
| 5,074,092 A | 12/1991 | Norlander |
| 5,075,059 A | 12/1991 | Green |
| 5,089,296 A | 2/1992 | Bafford et al. |
| 5,096,945 A | 3/1992 | Sun |
| 5,142,835 A | 9/1992 | Mrocca |
| 5,167,105 A | 12/1992 | Isban et al. |
| D335,982 S | 6/1993 | Brandon |
| 5,219,634 A | 6/1993 | Aufderhaar |
| D338,718 S | 8/1993 | Izzo |
| 5,239,799 A | 8/1993 | Bies et al. |
| 5,262,217 A | 11/1993 | Blaauw |
| 5,293,726 A | 3/1994 | Schick |
| D349,352 S | 8/1994 | Csati |
| 5,344,484 A | 9/1994 | Walsh |
| 5,355,654 A | 10/1994 | Stanley |
| 5,369,869 A | 12/1994 | Bies et al. |
| 5,374,474 A | 12/1994 | Pratt et al. |
| 5,397,406 A | 3/1995 | Vaders et al. |
| 5,401,556 A | 3/1995 | Ishitoya et al. |
| 5,401,588 A | 3/1995 | Garvey et al. |
| 5,443,891 A | 8/1995 | Bach |
| 5,470,631 A | 11/1995 | Lindquist et al. |
| D366,939 S | 2/1996 | Schafernak |
| D367,121 S | 2/1996 | Schafernak |
| D370,269 S | 5/1996 | Schafernak |
| 5,516,472 A | 5/1996 | Laver |
| D371,852 S | 7/1996 | Schafernak |
| 5,543,234 A | 8/1996 | Lynch et al. |
| 5,554,438 A | 9/1996 | Marcinko et al. |
| 5,560,168 A | 10/1996 | Gagne et al. |
| D375,424 S | 11/1996 | Burwick |
| 5,603,881 A | 2/1997 | Hanna |
| 5,634,508 A | 6/1997 | Herbst |
| D382,350 S | 8/1997 | Lynch |
| 5,677,369 A | 10/1997 | Walsh |
| D388,196 S | 12/1997 | Schafernak et al. |
| 5,718,786 A | 2/1998 | Lindquist |
| 5,766,774 A | 6/1998 | Lynch et al. |
| 5,782,055 A | 7/1998 | Crittenden |
| 5,829,218 A | 11/1998 | Murray et al. |
| 5,887,402 A | 3/1999 | Ruggie et al. |
| 5,900,463 A | 5/1999 | Tanimoto et al. |
| D411,022 S | 6/1999 | Schafernak et al. |
| 5,908,496 A * | 6/1999 | Singule et al. ............... 106/271 |
| 5,941,032 A | 8/1999 | Lydon, Jr. |
| 5,950,382 A | 9/1999 | Martino |
| 5,954,962 A | 9/1999 | Adiletta |
| 5,972,266 A | 10/1999 | Fookes et al. |
| 6,024,908 A | 2/2000 | Koncelik |
| D426,645 S | 6/2000 | Bonomo et al. |
| 6,073,419 A | 6/2000 | Moyes |
| 6,092,343 A | 7/2000 | West et al. |
| 6,200,687 B1 | 3/2001 | Smith et al. |
| 6,231,656 B1 | 5/2001 | Dekerf et al. |
| 6,277,943 B1 | 8/2001 | Sarpeshkar et al. ............ 528/65 |
| 6,288,255 B1 | 9/2001 | Skinner |
| 6,309,503 B1 | 10/2001 | Martino |
| 6,312,540 B1 | 11/2001 | Moyes |
| 6,335,082 B1 | 1/2002 | Martino |
| 6,368,457 B1 | 4/2002 | Kraus et al. |
| 6,368,528 B1 | 4/2002 | Whelan et al. |
| 6,378,266 B1 | 4/2002 | Ellingson |
| 6,401,414 B1 | 6/2002 | Steel et al. |
| 6,434,898 B1 | 8/2002 | Ward et al. |
| 6,458,238 B1 | 10/2002 | Mente et al. |
| 6,464,820 B2 | 10/2002 | Mente et al. |
| 6,470,940 B1 | 10/2002 | Pu et al. |
| 6,485,800 B1 | 11/2002 | Liittschwager et al. |
| 6,487,824 B1 | 12/2002 | West et al. |
| 6,531,010 B2 | 3/2003 | Puppin |
| 6,533,889 B2 | 3/2003 | Dueholm et al. |
| 6,576,049 B1 | 6/2003 | Dilts et al. |
| 6,588,162 B2 | 7/2003 | Lynch et al. |
| 6,589,660 B1 * | 7/2003 | Templeton et al. ............ 428/452 |
| 6,596,209 B2 | 7/2003 | Uhland et al. |
| 6,602,610 B2 | 8/2003 | Smith et al. |
| 6,610,232 B2 | 8/2003 | Jacobsen et al. |
| 6,619,005 B1 | 9/2003 | Chen |
| 6,620,459 B2 | 9/2003 | Colvin et al. |
| 6,696,160 B2 | 2/2004 | Partusch et al. |
| 6,702,969 B2 | 3/2004 | Matuana et al. |
| 6,730,249 B2 | 5/2004 | Sears et al. |
| 6,740,279 B2 | 5/2004 | West et al. |
| 6,750,310 B1 | 6/2004 | Skinner |

| | | | |
|---|---|---|---|
| 6,826,881 B2 | 12/2004 | McGregor | |
| 6,866,740 B2 | 3/2005 | Vaders | |
| 6,884,852 B1 | 4/2005 | Klauck et al. | 525/458 |
| 6,887,911 B2 | 5/2005 | Shidaker et al. | |
| 6,983,684 B2 * | 1/2006 | Husted | 100/92 |
| 7,018,461 B2 | 3/2006 | Massidda et al. | |
| 7,022,414 B2 | 4/2006 | Davina et al. | |
| 7,029,612 B2 | 4/2006 | Moriarty | |
| 7,137,232 B2 | 11/2006 | Lynch et al. | 52/784.1 |
| 7,178,308 B2 | 2/2007 | Fagan et al. | 52/800.1 |
| 7,284,352 B2 | 10/2007 | Lynch et al. | 52/455 |
| 7,337,544 B2 | 3/2008 | Fagan et al. | 29/897.32 |
| 7,370,454 B2 | 5/2008 | Lynch et al. | 52/784.1 |
| 7,390,447 B1 * | 6/2008 | Clark et al. | 264/120 |
| 2001/0001356 A1 | 5/2001 | West et al. | |
| 2001/0026862 A1 | 10/2001 | Smith et al. | |
| 2002/0005602 A1 | 1/2002 | Jacobsen | |
| 2002/0068161 A1 | 6/2002 | Matuana et al. | |
| 2002/0091218 A1 | 7/2002 | Ford et al. | |
| 2002/0106498 A1 | 8/2002 | Deaner et al. | |
| 2002/0121327 A1 | 9/2002 | Mente et al. | |
| 2002/0121340 A1 | 9/2002 | Menke et al. | |
| 2002/0155223 A1 | 10/2002 | Colvin et al. | |
| 2003/0015122 A1 * | 1/2003 | Moriarty et al. | 106/268 |
| 2003/0171457 A1 | 9/2003 | Matuana et al. | |
| 2003/0200714 A1 | 10/2003 | Minke et al. | |
| 2004/0034113 A1 | 2/2004 | Shidaker et al. | |
| 2004/0067353 A1 | 4/2004 | Miller et al. | |
| 2004/0229010 A1 * | 11/2004 | Clark et al. | 428/98 |
| 2005/0028465 A1 | 2/2005 | Horsfall et al. | |
| 2005/0155691 A1 * | 7/2005 | Nowak et al. | 156/62.2 |
| 2006/0053744 A1 | 3/2006 | Thompson et al. | |
| 2006/0272253 A1 | 12/2006 | Wolf et al. | |
| 2007/0082997 A1 | 4/2007 | Pfau et al. | |
| 2007/0110979 A1 | 5/2007 | Clark et al. | |
| 2007/0204546 A1 | 9/2007 | Lynch et al. | |
| 2008/0286581 A1 | 11/2008 | Clark et al. | |
| 2009/0001628 A1 | 1/2009 | Broker et al. | |
| 2009/0113830 A1 | 5/2009 | Clark et al. | |
| 2009/0114123 A1 | 5/2009 | Clark et al. | |
| 2010/0021706 A1 | 1/2010 | Clark et al. | |

FOREIGN PATENT DOCUMENTS

| | | |
|---|---|---|
| CA | 2 437 826 | 8/2002 |
| DE | 3801486 A1 | 8/1989 |
| EP | 0 049 299 B1 | 4/1982 |
| EP | 0 103 048 A2 | 3/1984 |
| EP | 0 225 629 B2 | 6/1987 |
| EP | 0 346 640 A1 | 12/1989 |
| EP | 0 688 639 A3 | 3/1996 |
| EP | 0 909 295 B1 | 3/2002 |
| EP | 1 170 456 A1 | 9/2002 |
| EP | 1 529 919 A1 | 5/2005 |
| GB | 2 349 163 A | 10/2000 |
| JP | 10238236 | 9/1998 |
| JP | 11318598 | 11/1999 |
| WO | WO 98/32600 * | 7/1998 |
| WO | WO 00/24577 | 5/2000 |
| WO | WO 02/064337 | 8/2002 |
| WO | WO 2004/076141 A2 | 9/2004 |

OTHER PUBLICATIONS

"Factory-Fitted Douglas Fir Entrance Doors," U. S. Department of Commerce, Commercial Standard CS91-41, Feb. 10, 1941.
Douglas Fir Doors, E. A. Nord Company, Specifications of Pacific Northwest Fir Doors, 3 pages, 1953.
Mercer, Henry C., Sc. D., "Ancient Carpenter's Tools," The Bucks County Historical Society, Doylestown, PA, p. 131-133, 1960.
Architectural Woodwork Quality Standards, Guide Specifications and Quality Certification Program, Fifth Edition, The Architectural Woodwork Institute, p. 109.
Lloyd, William B., Millwork Principles and Practices, Manufacture-Distribution-Use, Cahners Publishing Company, Inc., Chicago, IL., in assoc. with The National Woodwork Manufacturers Association, Inc., Table of Contents, pp. 192, 241, 116-117, 167, 173 © 1966.
Feirer, John L., Cabinetmaking and Millwork, Chas A. Bennett Co., Inc., Peoria, IL., pp. 4, 8-14, 145-146, 596-597, 684-687, © 1967. 1970.
A recorded voluntary standard of the trade published by the U. S. Dept. of Commerce, Commercial Standard CS73-61, Old Growth Douglas Fir, Sitka Spruce and Western Hemlock Doors, 3 pgs., effective Mar. 20, 1961.
1981 Sweet's Catalogue, Section 8-3/50, p. 7.
Hechinger Brochure—dated Mar. 16, 1986.
Masonite Brand Door Facings—brochure, published in 1987.
Elite Doors—brochure, apparently published in Oct. 1987.
Quality Doors Brochure © 1988.
"The New Mission Series" product brochure by Nord, Part of the JELD-WEN family, 300 W. Marine View Drive, Everett, WA 98201-1030, in existence at least as of Oct. 29, 2002.
1981 Sweet's Catalogue, Section 9.31/MO, p. 3, door in center of page.
VISADOR Brochure, date unknown.
Aurora Brochure, "Elements of Enduring Beauty," dated 2002.
JELD-WEN Brochure, "Knotty Alder Composite Exterior Doors," dated 2003.
Abstract of JP11318598, Nov. 24, 1999, Matsushita Electric Inc. Co. Ltd.
Abstract of JP10238236, Sep. 8, 1998, Okura Industrial Co. Ltd.
PCT International Search Report and Written Opinion, completed Jul. 5, 2008, mailed Jul. 14, 2008, PCT/US08/54298, International Filing date Feb. 19, 2008, JELD-WEN, inc.
Mar. 31, 2010 Office action in connection with U.S. Appl. No. 12/152,529.
Peters, J.J. et al., Selected Properties of Hybrid Poplar Clear Wood and Composite Panels, May 2002.
Dec. 18, 2007 Office action in connection with U.S. Appl. No. 10/856,683.
Apr. 18, 2007 Office action in connection with U.S. Appl. No. 10/856,683.
Oct. 6, 2006 Office action in connection with U.S. Appl. No. 10/856,683.
Sep. 28, 2010 Office action in connection with U.S. Appl. No. 12/152,902.
Mar. 2, 2010 Office action in connection with U.S. Appl. No. 12/152,902.
Apr. 1, 2009 Office action in connection with U.S. Appl. No. 12/152,902.
Oct. 1, 2007 Office action in connection with U.S. Appl. No. 10/785,559.
Apr. 18, 2007 Office action in connection with U.S. Appl. No. 10/785,559.
Jul. 7, 2006 Office action in connection with U.S. Appl. No. 10/785,559.
Jul. 22, 2010 Office action in connection with U.S. Appl. No. 11/983,091.
Oct. 29, 2009 Office action in connection with U.S. Appl. No. 11/983,090.
English translation of Columbian Office Action No. 3043 in connection with Columbian Patent Application No. 05095237 (Dated before Apr. 30, 2010) corresponding to U.S. Appl. No. 10/785,559.
Jul. 15, 2009 Australian Office Action in connection with Australian Patent Application No. 2004215420 corresponding to U.S. Appl. No. 10/785,559.
International Search Report and Written Opinion for International Patent Application No. PCT/US10/56041, Jan. 7, 2011.
PCT ISR for PCT/US2008/012576, Mar. 20, 2009.
PCT ISR for PCT/US2004/005415, Oct. 28, 2004.
ABTCO, The Ultimate Source for Next-Generation Building Products, ABT Building Products Corporation, 1996.
American/Cameo, Profiles, web page at http://www.abtco.com/AmerCam2.htm, as available via the Internet and printed Jun. 17, 2000.
Article from Panel World, Sep. 2006, entitled Gutex Operation Implements New Process in Wood-Fiber Insulating Board Plant.
Barnett Millworks Inc. introduces Mahogany Entry Door Systems, 2000.
Bayer Polymers America, "Bayer Polymers and Warner Industries LLC Give Standard Steel Garage Doors a Facelift." Web page at http://www.pu2pu.com/htdocs/customers/bayer/Warner.htm, as available via the Internet and printed Sep. 20, 2004.

Blomberg Window Systems, 2000.

Core Molding Technologies, web page at http://www.coremt.com; as available via the Internet and printed Feb. 3, 2004.

DuPont Zonyl Fluorochemical Intermediate, Jun. 21, 2003, www.dupont.com/zonyl/pdf/intermediates.pdf.

Elite Doors Brochure—apparently published in Oct. 1987.

Fiberglass Non-Textured Entry Systems, Masonite International Corporation, Big Builder, May 2003.

Grand Passage Fiberglass Entrances by Georgia Pacific, 1994.

Gurke, Huntsman Polyurethanes, New Advances in Polymeric MDI Variants, EUROCOAT, Barcelona Spain—Jun. 2002.

Hardboard Siding and Accessories, Pro-1 Hardboard Siding, web page at http://www.abtco.ccom/Harprod.htm as available via the Internet and printed Jun. 17, 2000.

How to Measure, Entry Door, Door Comparison, web page at http://www.stanleyworks.com/productgroups/doors/comparisons.asp, as available via the Internet and printed Apr. 11, 2002.

Intro 2, Entry Doors, Stanley's Commitment to Quality and Value, web page at http://www.stanleyworks.com/productgroups/doors/companions.asp, as available via the Internet and printed Apr. 11, 2002.

Knock on Wood, Pro Sales, Mar. 2002.

Lifetime Doors, Inc. Welcome to Lifetime Doors, web page at wysiwyg://29/http://www.lifetimedoors.com/Lifetime2.htm, as available via the Internet and printed Jan. 2, 2001.

Ultimate Building Material, Milgard Windows, web page at www.milgard.com as available via the Internet, 2001.

Milgard WoodClad Windows and Doors, Milgard Windows, 1998.

Outswing French Door, "Are You Prepared for the Possibilities?" Web page at http://www.marvin.com/showroom/bodies/outswing.asp, as available via the Internet and printed Jun. 19, 2000.

Products, Open Design's Door, Professional Builder, Jun. 1994, p. 127.

Products and Services, Robert Bowden, Inc. Building Materials and Millwork, 2001.

Raised Panel Interior Doors by Premdor, Jun. 2000.

Schut, J. H., "Wood is Good for Compounding Sheet and Profile." Plastics Technology Online Article, web page at http://www.webclipping.com/cgi-bin/hl.cgi?a-2925&c=10473&t-3, as available via the Internet and printed Feb. 13, 2001.

Semco Windows and Doors. Web page available at www.semcowindows.com, as available via the Internet and printed Aug. 2000.

Sliding Patio Doors, web page at http://www.lincolnwindows.com/sidoor.htm, as available via the Internet and printed on Jan. 18, 2001.

Suppliers Showcase, "Register at BIS 2004!" web page at http://;www.buildingindustryshow.com/showcase.html, as available via the Internet and printed Sep. 20, 2004.

The Finest Material, Dixie Pacific Manufacturing Company, 1996.

Therma-Tru Doors, Homeowners, web page at http://www.thermatru.com/homeowner/index.html, as available via the Internet and printed Apr. 11, 2002.

Tucker Millworks, "Climate Seal" Product Line, web page at http://www.tuckermillworks.com/csealintro.htm, as available.via the Internet and printed Jan. 24, 2001.

What's New in Entry Doors: Manufacturers and Suppliers Offer a Variety of New Ways to Enhance Aesthetics and Performance, Window and Door, Aug. 2000, pp. 75-76.

What You've Come to Expect from Milgard Windows, Building Products, Nov.-Dec. 2001.

Windows and Patio Doors, Lincoln Windows, Brochure, 2000, 57 pages.

"You have precisely one window in mind. Which is why we offer roughly 4,000,000 variations." Milgard Windows, Residential Architecture, May 2002.

You Won't See G-P Products in the New American Home, George-Pacific, 1994.

Premdor, Construction of Premdor Doors, Flush Hollow-Core Series, Premdor Reference Guide, 1998, pp. 27-28.

May 18, 2009 Office action in the corresponding European Pat. Appl. No. 04714173.4-2307.

* cited by examiner

MOLDED THIN-LAYER LIGNOCELLULOSE COMPOSITES HAVING REDUCED THICKNESS AND METHODS OF MAKING SAME

RELATED APPLICATIONS

This application claims priority to U.S. Provisional Patent Application Ser. No. 60/467,863, filed May 5, 2003. The disclosure of U.S. Provisional Patent Application Ser. No. 60/467,863 is hereby incorporated by reference in its entirety herein.

NOTICE OF COPYRIGHT PROTECTION

A section of the disclosure of this patent document and its figures contain material subject to copyright protection. The copyright owner has no objection to the facsimile reproduction by anyone of the patent document, but otherwise reserves all copyright rights whatsoever.

FIELD OF THE INVENTION

The present invention relates to thin-layer composites for building structures and the manufacture thereof. In selected embodiments, the present invention provides wood-based composite door skins of reduced thickness and methods for making such door skins.

BACKGROUND

Wood-based doors may be solid wood, or may be made as a wood composite. Composite wood doors may be covered with a wood-containing water-resistant layer known as a molded skin or a door skin. Wood-based door skins may be formulated as wood composites that are molded as thin layers and then adhesively secured to the underlying door frame to provide a water-resistant outer surface. Generally, door skins are made by mixing wood fiber, a resin binder and optionally, a wax, and then pressing the mixture under conditions of elevated temperature and pressure to form a thin-layer wood composite which is then adhered to the underlying door frame.

As the demand for composite doors increases, there is an increasing need to streamline all facets of the manufacturing process. In addition, due to ever increasing environmental concerns, there is a need to reduce waste in the production process and to minimize the amount of raw materials used. Balanced against these concerns is the need to maintain product quality. For example, door skins of reduced cost may be produced by lowering the percentage of resin or wood used per door skin, but this can lead to a reduction in quality. Thus, there is a need to provide methods to optimize production of composite doors and door skins used in such doors.

SUMMARY

Embodiments of the present invention provide molded thin-layer composites having reduced thickness and methods for making the same. An example embodiment of the present invention comprises a thin-layer composite comprising refined lignocellulosic fibers and a polymer resin, wherein the resin is used to adhere the lignocellulosic fibers to each other, and wherein the composite is pressed to a reduced thickness. In one embodiment, the thin-layer composite of reduce thickness comprises substantially the same density as compared to thicker composites having the same formulation.

Additional embodiments of the present invention provide methods for making molded thin-layer composites having reduced thickness. In an embodiment, the method comprises forming a mixture comprising a refined lignocellulosic fiber and a resin; pre-pressing the mixture into a loose mat; and pressing the mat between two dies at an elevated temperature and pressure and for sufficient time to form a thin-layer lignocellulosic composite comprising a reduced thickness. In an embodiment, the thin-layer composite of reduce thickness comprises substantially the same density as compared to thicker composites having the same formulation.

There are numerous advantages that may be associated with embodiments of the present invention. One advantage associated with the method of preparing the thin-layer lignocellulosic composites of the present invention can be a significant reduction in manufacturing workload for the step of refining the wood fibers.

Another advantage associated with an embodiment of a method of preparing the thin-layer lignocellulosic composites as described herein can be a significant reduction in manufacturing workload for the step of blending the wood fibers with resin.

Another significant advantage associated with embodiments of the method of making the thin-layer lignocellulose composites of the present invention may be reduced chemical emissions per unit product.

Also, embodiments of the thin-layer lignocellulose composites described herein may have less propensity to warp an underlying structure upon shrinking or swelling due to moisture.

When applied to the manufacture of door skins, it will be recognized by those in the art that an embodiment of a method and composition disclosed herein may include one or more of the following:

1. Preparation of thin-layer wood composite door skins providing reduced stress on the underlying frame upon loss and gain of moisture;
2. Preparation of door skins at reduced cost;
3. Reduction in wear for the refiner and blender used to make the door skins;
4. Reduced chemical emissions during manufacturing due to lower resin content;
5. Reduction in shipping and handling costs of door skins that weigh less; and
6. Changes that are easily implemented in production facilities that make individually pressed door skins.

From the foregoing summary, it is apparent that an object of the present invention is to provide thin-layer composites, such as door skins or other thin-layer composite structures, having reduced thickness. It is to be understood that the invention is not limited in its application to the specific details as set forth in the following description and figures. The invention is capable of other embodiments and of being practiced or carried out in various ways.

DETAILED DESCRIPTION

Figure 1:
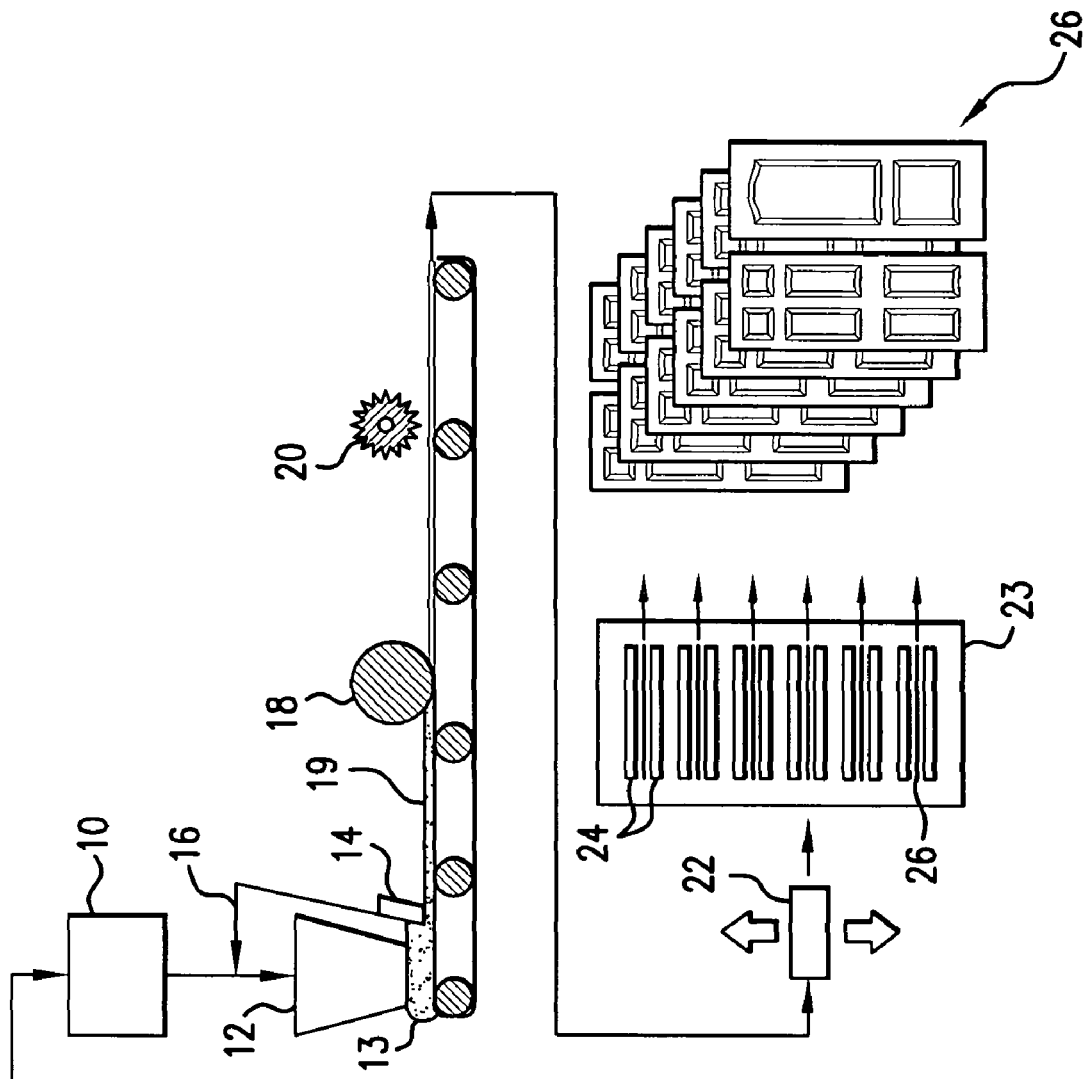
FIG. 1 shows an overview of a method used to make thin-layer lignocellulose door skins in accordance with an embodiment of the present invention.

The present invention provides thin-layer lignocellulose composites, such as door skins, that have reduced thickness, and methods of making such thin-layer lignocellulose composites. The advantages of producing thinner lignocellulose composites such as door skins are reflected in the final product, which can be lighter, easier to work with, and may show less tendency to warp an underlying frame upon gain and loss of moisture than the composites currently available. The advantages of producing thinner lignocellulose composites may also be reflected in reduced manufacturing costs. By making composites of reduced thickness, there can be less wear and tear on equipment used to manufacture the composites, reduced emissions from the plant, reduced shipping cost, and less discarded waste.

Thus, embodiments of the present invention recognize that production of door skins having reduced thickness may provide a door skin having improved performance and reduced cost of manufacture. As described herein, making thinner door skins may provide numerous benefits to the production process. The benefits of the present invention are particularly suited for production facilities in which thin-layered wood composites are individually pressed and can translate into production facilities making similar types of thin-layer wood composites.

For example, in an embodiment, the present invention comprises a thin-layer composite door skin comprising refined lignocellulosic fibers and a polymer resin, wherein the resin is used to adhere the lignocellulose fibers to each other, and wherein the composite is pressed to a thickness of less than 0.115 inches (2.92 mm). In an embodiment, the thin-layer composite of reduce thickness comprises substantially the same density as compared to thicker composites having the same formulation.

Embodiments of the present invention also comprise methods for making thin-layer composites of reduced thickness. In an embodiment, the method comprises forming a mixture comprising a refined lignocellulosic fiber, a resin, and optionally a wax; pre-pressing the mixture into a loose mat; and pressing the mat between two dies at an elevated temperature and pressure and for sufficient time to form a thin-layer lignocellulosic composite comprising a reduced thickness with substantially the same density as compared to thicker composites having the same formulation.

In another embodiment, the thin-layer composites made by the methods of the present invention comprise door skins having a thickness of less than 0.115 inches (2.92 mm). Thus, in an embodiment, the present invention comprises a method for making a door skin of reduced thickness comprising the steps of: (a) forming a mixture comprising a refined lignocellulosic fiber and a resin; (b) pre-pressing the mixture into a loose mat; and (c) pressing the mat between two dies at an elevated temperature and pressure and for sufficient time to form a thin-layer lignocellulosic composite door skin comprising a thickness of less than 0.115 inches (2.92 mm). In an embodiment, the door skin of reduced thickness comprises substantially the same density as compared to thicker composites having the same formulation.

As used herein, lignocellulose comprises a material containing both cellulose and lignin as well as other compounds. Suitable lignocellulosic materials may include wood particles, wood fibers, straw, hemp, sisal, cotton stalk, wheat, bamboo, jute, salt water reeds, palm fronds, flax, groundnut shells, hard woods, or soft woods, as well as fiberboards such as high density fiberboard, medium density fiberboard, oriented strand board and particle board. In an embodiment, the lignocellulosic fiber is refined. As used herein, refined fiber comprises fibers and fiber bundles that have been reduced in size from other forms of a lignocellulose substrate such as, but not limited to, chips and shavings. In an embodiment, the lignocellulosic composites of the present invention comprise wood fiber. Refined wood fiber may be produced by softening the larger wood particles with steam and pressure and then mechanically grinding the wood in a refiner to produce the desired fiber size.

As used herein, a thin-layer composite comprises a flat, planar structure that is significantly longer and wide than it is thick. Examples of thin-layer lignocellulosic composites include wood-based door skins that are used to cover the frame of a door to provide the outer surface of the door. Such door skins may be only a few millimeters (mm) thick, but may have a surface area of several square feet or more. For example, a standard door skin that is about 36 inches (0.91 m) wide by about 80 inches (2.0 m) long may be about 0.125 inches (3.175 mm) thick. Other thin-layer lignocellulosic products may include medium density fiberboard (MDF), hardboard, particleboard, oriented strand board (OSB), and other panel products.

Thus, in an embodiment, the thin-layer composite of the present invention comprises a door skin. In an embodiment, the door skin may range in size from about 97 inches (2.46 m) in length by 49 inches (1.24 m) in width to about 60 inches (1.52 m) in length by 9 inches (0.23 m) in width. In an embodiment, the door skin may be sized to fit a standard door, or about 36 inches (0.91 m) wide by about 80 inches (2.0 m) long. Still, door skins of other sizes such as panels up to about 12 feet or more in length may be manufactured using the methods and systems of the present invention depending on the use for the final products. Alternatively, the thin-layer composite may comprise a panel, such as those used for doors, walls, kitchen cabinets, ceiling tiles and other structures.

In an embodiment, the thin-layer composite may comprise a thickness ranging from about 0.063 inches (1.60 mm) to about 0.5 inches (12.7 mm). In another embodiment, the thin-layer composite of the present invention may comprise a thickness ranging from 0.08 inches (2.03 mm) to about 0.114 inches (2.90 mm). In yet another embodiment, the thin-layer composite of the present invention may comprise a thickness ranging from about 0.090 inches (2.29 mm) to about 0.114 inches (2.90 mm). In other embodiments, the thin-layer composite may comprises a thickness ranging from about 0.100 inches (2.54 mm) to about 0.110 inches (2.79 mm).

The thin-layered lignocellulosic composites of the present invention may comprise a range of lignocellulose fiber concentrations. Thus, in an embodiment, the lignocellulose composite mixture may comprise about 70% to about 99% by weight fiber. In an another embodiment, the lignocellulosic composite mixture may comprise about 80% to about 95% by weight fiber.

The thin-layered wood composites of the present invention may comprise lignocellulosic fiber comprising a range of moisture levels. In an embodiment, the method does not require dehydrating the lignocellulosic fiber prior to treatment with the resin. Thus, in an embodiment, the lignocellulose fiber comprises from about 2% to about 20% moisture content by weight. In another embodiment, the lignocellulose fiber may comprise from about 4% to about 14% moisture by weight.

In an embodiment, the resin may be a formaldehyde-based resin, an isocyanate-based resin, or other thermoplastic or thermoset resins. Formaldehyde-based resins typically used to make wood composite products include phenol-formaldehyde, urea-formaldehyde, or melamine-formaldehyde resins. Phenol-formaldehyde resins provide good water-resistance, but may require a high temperature cure. Also, phenol-formaldehyde resins are sensitive to the amount of water in the wood as excess water can inhibit the high temperature cure. Urea and melamine-formaldehyde resins do not require a high temperature cure, but may not provide comparable water-resistance (at the same resin content) in the door skin product. For example, for the manufacture of door skins, Dynea's urea formaldehyde resin #11A6117 may be used. Alternatively, isocyanate resins may be used. As compared to thin-layer composites made using phenol-formaldehyde resins, thin-layer composites that utilize high-temperature pressed isocyanate resin binder may display increased surface strength. Thus, in an embodiment, the thin-layer composite comprises an isocyanate resin as described in commonly owned, co-pending U.S. patent application Ser. No. 10/785,559, entitled "Thin-Layer Lignocellulose Composites Having Increased Resistance to Moisture and Methods of Making Same," filed Feb. 24, 2004, which is hereby incorporated by reference in its entirety.

The amount of resin used may be varied based on the type of resin being used, the type of lignocellulose fiber in the composite, the moisture level in the lignocellulosic fibers, and the type of thin-layer composite being made. For example, in the embodiment of a wood-based door skin, the amount of resin may range from about 1 to 25% by weight of the composite. In other embodiments, the resin may range from about 3 to 15% by weight of the composite, or from about 5 to 10% by weight of the composite.

In an embodiment, the lignocellulosic composite mixture further comprises at least one type of wax. The wax may impart additional short-term water repellency to the wood composite. The type of wax used is not particularly limited, and waxes standard in the art of wood fiber processing may be used. In an embodiment, the wax increases the water repellency of the wood. Also in an embodiment, the wax selected is stable to the temperatures used for pressing the wood/resin mixture into a thin layer, and does not adversely affect the aesthetics or subsequent processing (such as priming or gluing) of the wood composite. Thus, the wax may be a natural wax or a synthetic wax generally having a melting point in the range of about 120° F. (49° C.) to about 180° F. (82° C.). Waxes used may include, but are not limited to, paraffin wax, polyethylene wax, polyoxyethylene wax, microcrystalline wax, shellac wax, ozokerite wax, montan wax, emulsified wax, slack wax, and combinations thereof. For example, the mixture may comprise up to about 2% by weight of wax. In one embodiment, about 0.5% by weight wax is used.

As described herein, the amount of lignocellulosic fiber, resin and optionally, wax, may be varied as required by the particular composite being formulated. In an example embodiment, the wood fiber/wax is then blended with resin to generate a door skin of reduced thickness of less than 0.115 inches comprising a final content of about 90-95% wood fiber, about 5-10% resin and optionally, about 0.5% wax.

Embodiments of the thin-layer composites of the present invention may also include a pre-press sealer. As used herein, a pre-press sealer comprises a liquid material that may be applied to the surface of the mat used to formulate the thin-layer composite prior to the mat entering the press. The pre-press sealer may added to improve the surface appearance and performance properties of the thin-layer composite. The pre-press sealer may also allow for faster heat transfer from the top die into the fiber mat to cure the resin. The pre-press sealer may comprise any thermoset resin, normally diluted with water to less than 50% solids.

The lignocellulosic mixtures of the present invention may be pressed into thin-layers using flat or molded dies at conditions of elevated temperature and pressure. In an example embodiment, the mixture may initially be formed into a loose mat, and the mat placed in a die press. Because the composite includes amounts of resin that are sufficient to increase the water resistance of the composite mixture, the composite may stick to the surface of the dies that are used to press the mat into the resultant thin layer composite. Thus, embodiments of the method for making thin-layer composites of reduced thickness may include steps to reduce sticking of the thin-layer composite to the surfaces used to press the composite.

Thus, in an embodiment, to reduce sticking of the thin-layer composite to the surface used to press the composite, the method may include exposing the composite mixture to a release agent prior to pressing the composite. The release agent may be added directly to the lignocellulosic composite mixture as an internal release agent prior to pre-pressing the mixture into a loose mat. Alternatively and/or additionally, the release agent may be sprayed on the surface of the mat before the mat is pressed into a thin layer. In an embodiment, the release agent may comprise an aqueous emulsion of surfactants and polymers. For example, the release agent may comprise compounds used in the door skin manufacturing industry such as, but not limited to, PAT®7299/D2 or PAT®1667 (Wurtz GmbH & Co., Germany).

Thus, in an embodiment, a release agent may be added directly to the mixture used to form the wood composite as an internal release agent. For the manufacture of door skins, the release agent may comprise about 0.1% to about 8% by weight of the composite. The internal release agent may be added as a solution (typically about 25% to 50% solids) and blended with the wood fiber, resin and wax. Adding the release agent as part of the wood composite may require the use of more release agent than when only the surface of the composite is exposed. In some cases (e.g., low production runs) the cost of the extra materials is justified since the production set up is simplified by not requiring equipment to spray the release agent onto the mat.

Alternatively and/or additionally, the release agent may be sprayed on the surface of the composite prior to pressing the composite as a thin layer. In an example embodiment, the amount of release agent sprayed on to the mat surface may range from about 0.1 to about 8.0 grams solids per square foot (1.1 to 86.1 grams per square meter) of mat surface. Thus, for the manufacture of thin-layer door skins, the amount of release agent sprayed on the mat surface may comprise about 4 grams solids per square foot (43 grams per square meter) of mat surface. In an embodiment, an aqueous solution of about 25% release agent is applied to the mat surface. When the thin-layer composite comprises a door skin, the release agent may be applied to the surface of the mat that corresponds to the surface that will become the outer surface of the door skin.

The release agent may be clear, or it may include a pigment. For example, a tinted release agent sprayed on the outer surface of a door skin may facilitate subsequent priming or painting of the door. In this way, an even coloring may be applied to the thin-layered lignocellulosic composite.

Thus, the thin-layer lignocellulosic composites of the present invention may comprise wood fibers as well as wax and/or a release agent. For example, in an embodiment, the present invention comprises a thin-layer wood composite door skin of reduced thickness comprising a mixture of: (i) a wood fiber; (ii) an organic resin; (iii) optionally, at least 0.5% by weight of a wax; and (iv) optionally, at least 0.1% internal release agent by weight and/or at least 0.1 grams release agent per square foot (1.1 grams per square meter) on the surface of the composite, wherein the composite is pressed to a thickness of less than 0.115 inches (2.92 mm). In an embodiment, the thin-layer composite of reduced thickness comprises substantially the same density as compared to thicker composites having the same formulation.

Other strategies may be used to reduce sticking of the lignocellulosic composite to the dies used for making the resultant thin-layer composite. Thus, in another embodiment, at least one surface of the die used to press the mat is exposed to an anti-bonding agent. Exposing the die to an anti-bonding agent may comprise coating at least one of the dies used to press the mat with an anti-bonding agent. In an embodiment, coating the die may comprise baking the anti-bonding agent onto the die surface.

In an embodiment, the anti-bonding agent used to coat the die surface(s) is distinct from the release agent used to coat the mat. The anti-bonding agent used to coat the die surface(s) may comprise agents such as silane or silicone based chemicals that are known to be effective coating agents. These anti-bonding agents may not be particularly suitable for spraying directly on the wood mat (or incorporating into the wood composite) since compounds comprising silane or silicone may interfere with later finishing of the wood product by priming and/or painting. In an example embodiment, the anti-bonding agent used to coat the die surface may comprise anti-bonding agents known in the art of die pressing such as, but not limited to, CrystalCoat MP-313 and Silvue Coating (SDC Coatings, Anaheim, Calif.), Iso-Strip-23 Release Coating (ICI Polyurethanes, West Deptford, N.J.), aminoethylaminopropyltrimethoxysilane (Dow Corning Corporation), or the like.

For thin-layer door skins, the die that is coated with the anti-bonding agent may correspond to the die used to press the outside surface of the door skin. Alternatively, both dies may be coated with an anti-bonding agent. The amount of anti-bonding agent used to coat the die surface may range in thickness from about 0.0005 to about 0.010 inches (i.e., about 0.0127 mm to about 0.254 mm). Thus, in one embodiment, the amount of anti-bonding agent used to coat the die surface comprises about 0.003 inches (i.e., about 0.0762 mm).

In one embodiment, coating the die may comprise baking the anti-bonding agent onto the die surface. For example, the step of baking the anti-bonding agent onto the die surface may comprise the steps of: (i) cleaning the die surface free of dirt, dust and grease; (ii) spraying a solution of the anti-bonding agent onto the die (e.g., from about 0.0005 to about 0.010 inches or about 0.0127 to 0.254 mm of a 50% solution); and (iii) baking the die (e.g., at greater than 300° F. (149° C.) for about 1 to 4 hours). In an embodiment, the step of cleaning the die comprises cleaning the die surface with a degreaser, wire brushing to remove solids, wiping the die surface with a solvent (such as acetone), and buffing with a cotton pad. Under suitable conditions, the anti-bonding agent that is baked onto the die (or dies) is stable enough to the pressing conditions such that the die(s) can be used for over 2,000 pressing cycles prior to requiring a second coating with additional anti-bonding agent.

In other embodiments, to facilitate release of a door skin from the dies used to press the door skin, the die(s) may be nickel plated, chrome plated, covered with a ceramic layer, or coated with fluorocarbons.

In an embodiment, the step of exposing the pre-pressed mat to at least one release agent and/or anti-bonding agent may comprise adding an internal release agent and/or spraying one side of the mat with a release agent and also coating at least one die surface with an anti-bonding agent. In an embodiment, the side of the mat coated with the release agent may be the surface opposite to the surface of the mat exposed to the coated die. For example, in an embodiment, the present invention comprises a method to produce a thin-layer wood composite door skin having reduced thickness comprising the steps of: (a) forming a mixture comprising: (i) a refined wood fiber; (ii) a resin; (iii) optionally, a wax; and (iv) and optionally, a release agent; (b) pre-pressing the mixture into a loose mat; (c) optionally, spraying one or both surfaces of the mat with a release agent; and (d) pressing the mat between two dies at least one of which has been coated with an anti-bonding agent, at an elevated temperature and pressure and for a sufficient time to form a thin-layer lignocellulosic composite comprising a thickness of less than 0.115 inches (2.92 mm). In an embodiment, the door skin comprises substantially the same density as compared to thicker composites having the same formulation.

Because less material is used per thin-layer composite, embodiments of the present invention may provide for increased utilization of resources during the manufacturing process and improved properties of the thin-layer composite. Where the thin-layer composite comprises a door skin, there may be a reduction in the amount of lignocellulosic fiber used per door skin. Thus, the door skins of the present invention may comprise a reduction in lignocellulosic fiber per door skin of about 10 to 15%. In an embodiment, a reduction in the amount of lignocellulosic fiber used per door skin may be about 20 to 25%.

In an embodiment, the thin-layer composites of the present invention may exhibit reduced force upon shrinking and swelling as compared to thicker composites of the same chemical formulation and density. For example, door skins made using the thin-layer composites of the present invention may have less tendency to buckle or warp upon exposure to environmental weathering as compared to thicker composites of the same chemical formulation and density. In an embodiment, the reduction in thickness of the thin-layer composite is proportional to the reduction in force upon shrinking or swelling. For example, by reducing the mass of the thin-layer composite by about 10%, there can be a reduction in the force exerted by the thin-layer composite as it grows or shrinks by about 10%.

Also, embodiments of the thin-layer composites of the present invention are more flexible than thicker composites having the same formulation. For example, in an embodiment, the thin-layer composite door skins of the present invention comprise a modulus of elasticity under compression in the range of about 250,000 to 500,000 psi (or about 17,577 to about 35,154 kg/cm$^2$).

The reduction in lignocellulosic fiber per door skin may provide a reduction in work load at various steps in the manufacturing procedure. For example, the reduction in lignocellulosic fiber used per door skin may result in the ability to reduce the rate that the wood chips are sifted to remove fines, thereby allowing for more efficient removal of fines from the wood chips and less fines in the final product. For the purposes of making door skins, fines may be defined as wood particles that will pass through a 1/16 by 1/16 inch (1.59 by 1.59 mm) mesh screen. In an example embodiment, the rate of sifting the wood chips to remove fines for door skins of the present invention ranges from about 9,100 pounds (4,218 kg) per hour as compared to 10,000 pounds (4,536 kg) per hour for standard 0.125 inch (3.18 mm) door skins, or a reduction of about 9% in the rate of sifting during production of the door skins of the present invention. Thus, in an embodiment, the wood chips used to generate the refined wood fiber for the thin-layer composite door skins of the present invention comprise fewer fines than wood chips used to make standard 0.125 inch (3.18 mm) thick door skins. In an embodiment, the wood chips used to generate the refined wood fiber for thin layer door skins comprise about 2 to 22% fines. In other embodiments, the wood chips used to generate the refined wood fiber may comprise about 2 to 15% fines or alternatively, about 2 to 10% fines.

The reduction in lignocellulosic fiber per composite may also be associated with a reduced workload for the refiner used to prepare the lignocellulosic fibers that go into the thin layer composite. For door skins comprising reduced thickness, the reduction in lignocellulosic fiber per door skin may result in embodiments providing a reduction in the workload for the refiner of greater than 5% or alternatively, greater than 10%, or even greater than over 15%. In an embodiment, the reduction in lignocellulosic fiber per door skin results in a reduction in the workload for the refiner used to refine the wood in the range of about 5% to about 20% as compared to a door skin having a thickness of about 0.125 inches (3.175 mm).

The reduction in lignocellulosic fiber per door skin may also result in a reduction in the cost of drying the lignocellulosic substrate. In an embodiment, the reduction in energy costs of drying may range from about 5% to about 20% per door skin. In other embodiments, the reduction in energy costs of drying may range from about 10 to about 20% per door skin.

Also, because the door skins of the present invention are thinner than standard 0.125 inch (3.175 mm) thick door skins, there may be less resin required per door skin. The reduction in resin per door skin has the potential advantage of resulting in less resin build up in the blender. In an embodiment, the reduction in resin per door skin ranges from about 5% to about 20% as compared to a door skin having a thickness of about 0.125 inches (3.175 mm). In other embodiments, the reduction in resin per door skin ranges from about 10% to about 20% as compared to a door skin having a thickness of about 0.125 inches (3.175 mm).

The reduction in the amount of resin used is also associated with reduced chemical emissions per door skin. Thus, in an embodiment, the reduction in resin used per door skin may comprise a reduction in chemical emissions of 5 to 20% as compared to a door skin having a thickness of about 0.125 inches (3.175 mm). Alternatively, the reduction in resin used per door skin may comprise a reduction in chemical emissions of 10 to 20% as compared to a door skin having a thickness of about 0.125 inches (3.175 mm).

The thinner door skins of the present invention may weigh less and thus, be easier to handle than standard 0.125 inch thick door skins. In an embodiment, the reduction in wood fiber per door skin results in a reduction in the weight per door skin in the range of 5% to 20% as compared to a door skin having a thickness of about 0.125 inches (3.175 mm). Alternatively, the reduction in weight per door skin may range from 5% to about 15%, or in other embodiments, from about 5% to about 10% per door skin.

Preparation of Door Skins Comprising Reduced Thickness

FIG. 1 shows an overview of a general method used to prepare door skins. As shown in FIG. 1, a source of lignocellulosic fiber, such as a selected wood species 2, may be ground by a refiner 4 to prepare fibers of a uniform size. Wax may then be added and/or the lignocellulosic fibers may be at least partially dried 6. At this point, the fiber/wax blend may then be mixed with an appropriate binder resin (e.g., using atomization), until a uniform mixture is formed 8 and the preparation may be stored 10 until further processing. It is also common to add the resin to the fiber after the fiber storage bin and before the mixture is formed.

The fiber/resin mixture may then be processed by the former 12 into a loose mat 13. The loose mat 13 may then be pre-shaped using a shave-off roller 14 and pre-compressed using a pre-compressor 18 to mat 19 having a density of about 6-15 pounds per cubic foot. At this point, the excess mat material removed by the shaver may be recycled 16 back to the former. After further trimming to the correct size and shape, as for example, using a saw 20, the pre-pressed mats are transferred to a loader 22 to be loaded into a platen press 23, and each mat is compressed between two dies 24 under conditions of increased temperature and pressure. For example, standard pressing conditions may comprise pressing at 290° F. at 1200 psi for 10 seconds followed by 20 seconds at 500 psi (i.e., about 143° C. at 84.3 kg/cm$^2$ for 10 seconds followed by 20 seconds at 35.2 kg/cm$^2$). Generally, a recessed (female) die is used to produce the inner surface of the door skin, and a male die shaped as the mirror image of the female die is used to produce the outside surface of the door skin. Also, the die that forms the side of the door skin that will be the outer surface may include an impression to create a wood grain pattern. After cooling, the resulting door skins 26 are mounted onto a doorframe using a standard adhesive and employing methods standard in the art.

Previous efforts to improve the efficiency of the manufacture of door skins for wood composite doors have focused on reducing the percentage of raw materials used per door skin, or making the manufacturing process more efficient. Such efforts at streamlining production have not, however, targeted making the door skin thinner. By reducing the thickness of the final product, numerous advantages may be realized in the production process. A schematic of the production process, highlighting the numerous improvements associated with embodiments of the present invention is shown as FIG. 2.

Figure 2:
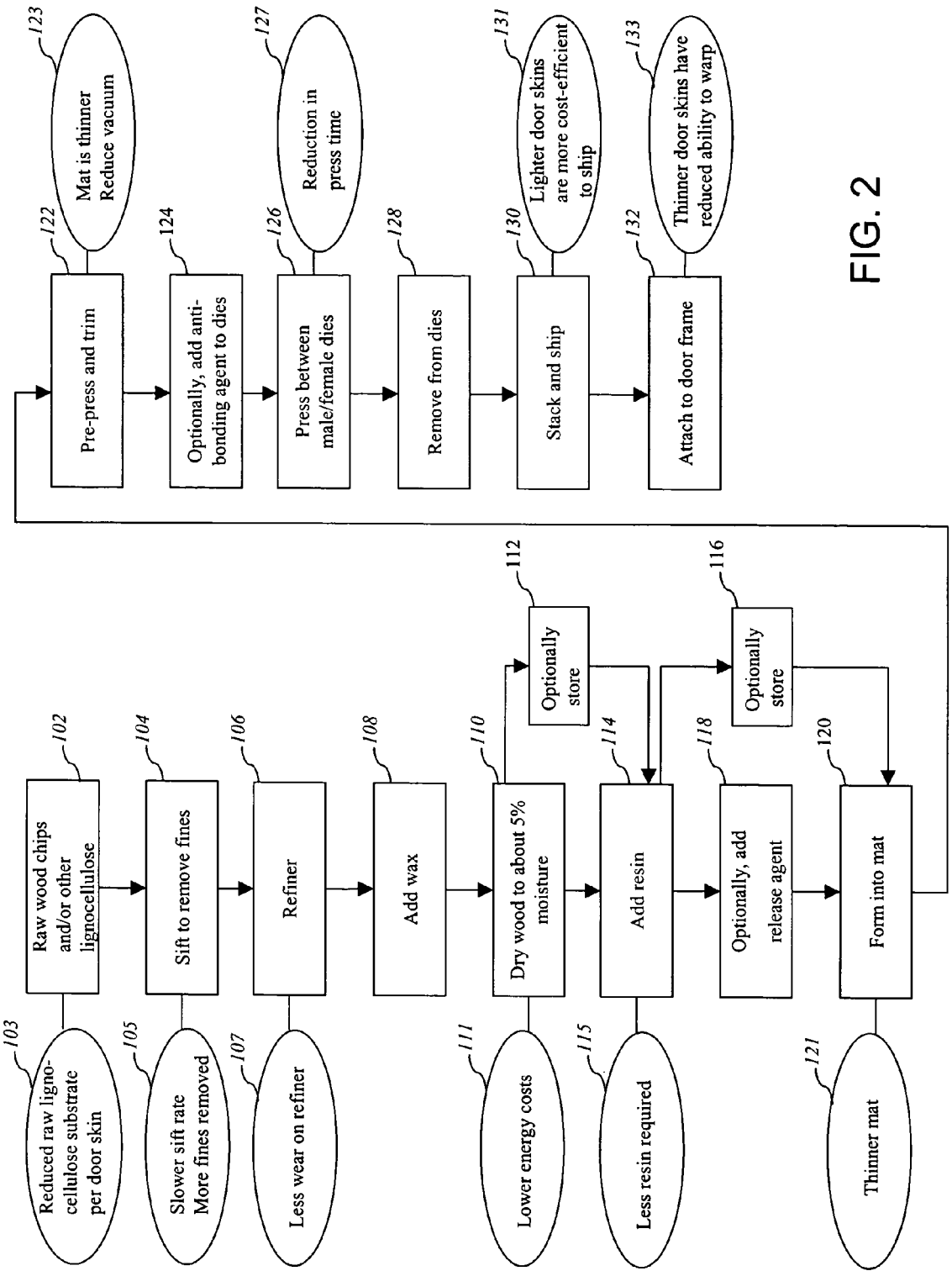
FIG. 2 shows a flow chart describing advantages (shown as ovals) provided at various steps of the manufacturing process (shown as rectangles) for making door skins of reduced thickness in accordance with an embodiment of the present invention.

As shown in FIG. 2, an initial step in the manufacture of door skins may be the selection of the wood or other lignocellulosic substrate to be used 102. In an embodiment, the present invention may provide for a reduction in the amount of wood or other lignocellulosic substrate required per door skin 103. Also in an embodiment, the present invention may realize an advantage at the early step 104 of sifting the lignocellulosic starting material to select for particles of the correct size. To produce high quality door skins, woodchips are sifted to remove fines. When wood chips are sifted through a 1/16× 1/16 inch screen at a rate of 10,000 lbs (4,536 kg) wood chips/hour, the sifted chips comprise about 10 to 30% fines. In the present invention, because less wood is needed to make thinner door skins, the sifting lines may be run at a slower rate 105. In an embodiment, the sifting lines are run at a rate that is about 9% slower than the rate used to make door skins that are not of reduced thickness. Running the lines at the slower rate of 9,100 pounds (4,128 kg) wood chips per hour provides for more efficient sifting, thus reducing the percentage of fines in the sifted product to a final value of 2 to 22% by weight fines.

Also, in an embodiment, the present invention realizes an advantage comprising less wear on the refiner 106 used to generate the wood fiber used in the door skin. In the refiner, the wood is moved across a series of plates with engineered grooves, each of which are separated by a few thousandths of an inch. The plates are etched such that the wood is thinned out as it moves from the center to the edges of the refiner to provide individual fibers or fiber bundles for the preparation of the door skins. A substantial cost associated with the manufacture of door skins is the cost of replacing the refiner plates.

Because the door skins of the present invention are thinner than standard door skins, less raw material is required per skin. Thus, in an embodiment, the reduction in wood used per skin is associated with a reduction in the wood being processed by the refiner 107. The reduction in workload on the refiner may be associated with reduced manufacturing costs due to replacing worn plates, and a reduction in down-time associated with refiner maintenance and repair. Such down-time can significantly add to the cost of production. In an embodiment, the reduction in refiner workload per door skin may comprise greater than 10% or alternatively, greater than 15%.

As described above, wax may be added to the wood fibers 108. The wax imparts additional short-term water repellency to the wood composite. Next the wood may be dried 110. In an embodiment, the present invention may provide for reduced energy costs associated with the step of drying the wood. For example, in making wood composite door skins, after the wood chips have been refined, excess moisture is removed. Raw wood chips generally comprise about 4 to 8% moisture, although for some types of wood, the moisture content can exceed 8%. For preparation of door skins, wood of about 5% moisture is preferred. Because less wood is required per door skin, the energy costs of drying the wood, per door skin, may be reduced 111.

After drying, the wood fiber mixture may be stored 112 prior to adding the resin. Alternatively, the wax/wood fiber mixture is blended with resin 114 prior to storing 116. In yet another embodiment, the resin is added prior to drying the wood and/or adding wax. Once the resin and wax have been added to the refined fiber, the fiber/resin/wax mixture may be formed into a loose mat 120. In some cases, a release agent may be added 118 to the fiber/resin/wax mixture or sprayed on the mat.

In an embodiment, the present invention allows for the use of reduced amounts of resin per door skin 115. The reduction in resin may comprise at least 5% less resin per door skin. In other embodiments, the reduction in resin may comprise at least 10%, or even greater than 15% per door skin. Using less resin per door skin can result in a lower cost per door skin. In addition, the reduction in resin can result in lower chemical emissions (e.g., formaldehyde and methanol) from the manufacturing facility.

In addition to the advantage of using less material, reducing the amount of resin may result in less resin build-up in the blender used to mix the resin with the wood fibers and wax. Over time, plates in the blender can develop a build-up of resin that may cure on the plates. When manufacturing door skins, significant down-time can result when the blender plates need to be cleaned. In addition to adding down-time to the manufacturing process, the particles of resin that become cured onto the blender plates may eventually become dislodged and fall into the wood mixture. These resin particles do not mix into the wood fibers, but remain as discrete solid particles that can form a spot or blemish on a certain percentage of the pressed door skins. This can result in door skins of reduced quality. By reducing the extent of resin build up on the blender plates, particulate build-up may be reduced, thereby resulting in door skins of improved quality.

Making door skins of reduced thickness may allow for using less material for the mat 120. Generally, to prepare a thin-layer door skin, the mat is formed thicker than required, and the excess is removed by shaving. To make a door skin that is 0.125 inches (3.175 mm) thick, the mat may be formed to be about 40% thicker than required. Thus, to make a standard door skin, a mat about 5 inches (127 mm) thick is prepared, and the excess removed by shaving. Making thinner door skins may comprise forming a thinner mat or shaving off more of the mat; the material shaved from the mat may then be recycled back into the starting mix.

Thus, in one embodiment of the method of making the thinner door skins of the present invention, the mat is made at a reduced thickness 121. For example, to form a thinner mat, the rate that wood goes into the forming head may be reduced per door skin. In this way, less wood is deposited as the mat. By pressing a flatter mat, there is reduced amount of material shaved off and recycled. Forming a flatter mat may be accomplished with reduced wood flow through the forming head. In this way, there is increased control of both the mat forming mechanism and the ability to evenly distribute the fiber.

In an alternative embodiment, the mats may be formed to the same initial thickness as is used for standard 0.125 inch door skins (i.e., a mat about 5 inches thick) such that the thickness is about 50% thicker than required. The extra mat material may then be removed by shaving.

The material shaved off of the mat is not discarded, but is recycled back into the system to generate additional mats. However, because the recycled fiber has been treated with resin, the fiber going back into the system may have a tendency to dry out and lose tack. In an embodiment, shaved fiber is collected and rerouted back into the pressing system for a predetermined number of times. For example, in an embodiment, the percentage of fiber recycled more than 4 times comprises 20% or less of the total fiber. In other embodiments, the percentage of fiber recycled more than 4 times may comprise 10% or less of the total fiber, or 5% or less of the total fiber.

Once the mat is formed, the mat may be pre-compressed to a predetermined thickness prior to pressing the thin-layer composite 122. For example, in an embodiment, the pre-compressor may presses the mat to a thickness of about 0.5 inches (12.7 mm).

After the mat has be pre-pressed, it is cut to the proper width and length to fit in a platen press, where the mat is compressed between two dies under conditions of increased temperature and pressure to form the molded skin. For cutting the mat, trim saws may used to cut the edges to the proper width, and a flying cut-off saw may be used to cut the mat to the proper length. In an embodiment, a gentle vacuum may be used to remove the material that has been trimmed from the mat. In the embodiment where a mat of reduced thickness is used, the amount of material removed and recycled is reduced, thus reducing wear on the vacuum 123. A reduction in the vacuum may be effected by moving the vacuum hood up higher from the mat. For example, the vacuum hood may be raised 1 inch to 2 inches higher above the mat for a door skin comprising a thickness of 0.110 inch (2.79 mm) to 0.115 inch (2.92 mm) as compared to a 0.125 inch (3.175 mm) doorskin.

Once the mats have been pressed, they may be introduced into the platen press 126. In an embodiment, to form the thinner mats of the present invention, a reduction in press time may be employed 127. Alternatively, press conditions used for standard 0.125 inch (3.175 mm) door skins may be used.

The conditions used to form the thin-layer composite door skins of the present invention may include compressing the mixture at elevated temperature and pressure for sufficient time to allow the resin to interact with the wood fibers. The temperature used to press the mat may range from about 250° F. (121° C.) to about 400° F. (204° C.). In other embodiments, the temperature used to press the mat may range from about 280° F. (138° C.) to about 350° F. (177° C.) or from about 290° F. (143° C.) to about 330° F. (166° C.). The exact conditions used will depend upon the equipment used, the exterior environment (e.g., temperature, elevation), the manufacturing schedule, the cost of input resources (e.g., starting materials, electric power), and the like. Also, varying the temperature may allow for changes to be made in the pressure used or the time of pressing; similarly, changes in pressure may require adjustment of the time and/or temperature used for pressing.

Similarly, the levels of the pressure applied during the pressing of the thin-layer composite may vary depending on a variety of factors, such as the nature of the thin-layer composite that is being formed, the equipment being used, environmental conditions, production capabilities, and the like. Thus, in an embodiment, the pressure during the pressing step may range from about 2500 psi (176 kg/cm$^2$) to about 150 psi (10.5 kg/cm$^2$). In another embodiment, the pressure may be applied in a step-wise manner. For example, the pressure during the pressing step may range from about 1200 psi (84.3 kg/cm$^2$) for about 5 to 20 seconds followed by 500 psi (35.16 kg/cm$^2$) for 20 to 80 seconds. For example, in one embodiment, the pressure during the pressing step ranges from about 1200 psi (84.3 kg/cm$^2$) for about 10 seconds to about 500 psi (35.16 kg/cm$^2$) for about 20 seconds.

In some cases, the resin used to make the thin-layer composites of the present invention may cause the composite to stick to the surface of the die used to press the composite into a thin-layer. Thus, in an embodiment, the present invention comprises the step of spraying at least one of the dies with an anti-bonding agent or spraying at least one surface of the mat with a release agent as described above 124. Also, to facilitate release of the door skin, the die(s) may be nickel plated, covered with a ceramic layer, or coated with fluorocarbons or silane-based compounds.

Also in an embodiment, the dies are carefully aligned prior to pressing to prevent sticking of the door skins to the dies. By carefully aligning the dies prior to pressing the door skin, shearing of the door skin is reduced. Thus, in an embodiment, preparation of the door skins of the present invention is associated with close monitoring of the die alignment step.

Next the door skins may removed from the surface of the press using a rotor to lift the skins from the surface of the press 128. In an embodiment, the thinner door skins of the present invention require less force to remove the door skins from the press than would be required for door skins of standard thickness (e.g., 0.125 inches; 3.175 mm). Thus, the rotor used to push the door skin out of the press may be slowed down on initial contact with the door skin, and then increased to its normal rate. This allows the door skin to be gently loosened prior to its removal from the press.

At this point, the door skins may be stacked for shipping 130. In an embodiment, the door skins of the present invention may comprise about 9 to 20% less weight per door skin than 0.125 inch (3.175 mm) thick skins. This may allow for an increase in the number of door skins shipped per truck 131. For example, with a reduction in weight of about 10%, about 4,400 door skins may be shipped in a standard flatbed truck, as opposed the maximum limit of 4,000 standard 0.125 inch (3.175 mm) door skins per truck, where the enclosed volume in the truck measures 52 feet 5.5 inches (16 m) in length by 101 inches (2.6 m) in width and 110 inches (2.8 m) in height at the front of the bed and 112.25 inches (2.85 m) at the rear of the bed.

Also, because the door skins of the present invention are lighter in weight, they may be easier to handle. Thus, a standard 36 inch (0.91 m) by 80 inch (2.0 m) door skin that is 0.125 inches (3.175 mm) thick and made to fit a standard door frame weighs approximately 12.4 pounds (5.62 kg). In contrast, the thinner door skins of the present invention weigh about 10 to 11 pounds (about 4.34 to 5.0 kg). This reduction in weight can make the door skins easier to flip and stack for packing 131.

In an embodiment, the door skins of the present invention are not only associated with reduced cost of production, but show improved performance. For example, a significant problem in the manufacture of wood composite products that are exposed to high or low relative humidity environments is that upon exposure to variations in temperature and moisture, the wood can lose water and shrink, or gain water and swell. This tendency to shrink and/or swell can significantly limit the useful lifetime of most wood products, such as wooden doors, often necessitating replacement after only a few years. The problem is particularly prevalent in areas of high moisture or in climates that are extremely hot or dry. Shrinking and swelling can also be a problem when the wood is exposed to a wet environment during construction, or upon exposure to dry heat, such as the dry heat used indoors in the winter.

Several methods have been explored to produce wood composites that show increased resistance to moisture uptake and loss. It is believed that swelling and/or shrinking of wood is, at least partially, the result of water reacting with hydroxyl groups present in cellulose and hemicelluloses. Thus, high moisture levels increase the amount of water bound to the wood fiber. Alternatively, in low humidity, water is lost from the wood fibers. In an embodiment, the thinner door skins of the present invention still swell and shrink with the loss and gain of moisture, but when attached to a door frame 132, do not exert as much force on the door frame upon shrinkage and expansion of the door skin 133. Thus, the door skins of the present invention are not as likely to bend the door frame as thicker door skins.

EXAMPLE

The following example describes the preparation of door skins having reduced thickness of the present invention. In the first step, wood was ground into chips and sifted at a rate of approximately 9,100 pounds (4,127 kg) per hour wood chips per to result in a wood chip preparation having less than 8% fines. At this point, the wood chips were transferred to the refiner for processing wood fibers. Because the door skins of the present invention are thinner than standard 0.125 inch (3.175 mm) door skins, there was a 12% reduction in work load at the refining step.

The wood fibers were then dried and mixed with wax. Once the wood was dried to about 5% moisture content, it was mixed with wax and then stored. It is estimated that the reduction in wood used per door skin resulted in a greater than 10% reduction in energy cost per door skin.

The wood fiber/wax was then blended with resin to generate a wood composite comprising final content of about 90-95% wood fiber, about 5-10% resin and about 0.5% wax. The actual levels of wood fiber, resin and wax may be varied depending upon the type of door skin made. The mixture was then formed into a mat about 4 inches thick, which was then pre-shaped using a shave off roller and then pre-compressed to a density of about 8 pounds per cubic foot.

After further trimming using trim saws, the excess material was removed using a vacuum hood, and the pre-compressed mat introduced into a platen press. The mats were then pressed at a temperature of about 290° F. (143° C.) using standard pressing conditions of about 1200 psi (84.39 kg/cm$^2$) for about 10 seconds followed by about 500 psi (35.16 kg/cm$^2$) for about 20 seconds, to generate door skins having a thickness of 0.115 inches (2.92 mm) or less. The resultant door skins weighted approximately 10-11 pounds (about 4.34 to 5.0 kg) per door skin. This allowed for 4,400 door skins to be shipped in a standard truck trailer.

It will be understood that each of the elements described above, or two or more together, may also find utility in applications differing from the types described. While the invention has been illustrated and described as a method for preparation of thin layer composites having reduced thickness, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as described herein.

That which is claimed is:

1. A method for making a molded thin-layer composite of reduced thickness comprising the steps of:
   forming a mixture comprising a refined lignocellulosic fiber, a resin, and a wax selected from the group consisting of paraffin wax, microcrystalline wax, shellac wax, ozokerite wax, montan wax, slack wax, emulsified waxes thereof, and combinations thereof;
   pre-pressing the mixture into a loose mat;
   coating at least one of two dies with an anti-bonding agent including a ceramic layer; and
   pressing the mat between the two dies at an elevated temperature and pressure and for sufficient time to form a thin-layer lignocellulosic composite comprising a thickness from about 0.063 inches (1.60 mm) to 0.115 inches (2.92 mm).

2. The method of claim 1, wherein the resin comprises a formaldehyde-based resin or an isocyanate-based resin.

3. The method of claim 1, wherein the mixture comprises an internal release agent that is an aqueous emulsion of surfactants and polymers distinct from the wax.

4. A method for making a door skin of reduced thickness comprising the steps of:
   forming a mixture comprising a refined lignocellulosic fiber, a resin, and a wax selected from the group consisting of paraffin wax, microcrystalline wax, shellac wax, ozokerite wax, montan wax, slack wax, emulsified waxes thereof, and combinations thereof;
   pre-pressing the mixture into a loose mat;
   coating at least one of two dies with an anti-bonding agent including a ceramic layer; and
   pressing the mat between the two dies at an elevated temperature and pressure and for sufficient time to form a thin-layer lignocellulosic composite door skin comprising a thickness from about 0.063 inches (1.60 mm) to 0.115 inches (2.92 mm).

5. The method of claim 4, comprising pressing the mat to a thickness ranging from about 0.063 inches (1.60 mm) to about 0.114 inches (2.90 mm).

6. The method of claim 4, comprising pressing the mat to a thickness ranging from about 0.090 inches (2.29 mm) to 0.114 inches (2.90 mm).

7. The method of claim 4, comprising pressing the mat to a thickness ranging from about 0.100 inches (2.54 mm) to 0.110 inches (2.79 mm).

8. The method of claim 4, further comprising adding a pre-press sealer to the at least one surface of the mat.

9. The method of claim 4, wherein the lignocellulosic fiber comprises wood.

10. The method of claim 9, wherein the wood used to generate the refined fibers comprises less than 22% fines, wherein fines comprise wood able to pass through a 1/16 inch by 1/16 inch (1.59 mm by 1.59 mm) mesh.

11. The method of claim 10, wherein the door skin has a size of about 80 inches (1.52 m) in length and 36 inches (0.23 m) in width and a weight of less than or equal to 11 pounds (5.0 kg).

12. The method of claim 11, wherein the resin comprises a formaldehyde-based resin or an isocyanate-based resin.

13. The method of claim 4, wherein the thin-layer composite comprises a modulus of elasticity of ranging from about 250,000 psi to about 500,000 psi.

14. The method of claim 13, wherein the reduction in lignocellulosic fiber per door skin results in a reduction in energy used to dry the fiber in the range of about 5% to 20% as compared to a door skin having a thickness of about 0.125 inches (3.175 mm).

15. The method of claim 4, wherein the release agent is sprayed onto at least one surface of the mat.

16. The method of claim 4, comprising a reduction in refined lignocellulosic fiber of up to 25% per door skin.

17. The method of claim 16, wherein the reduction in lignocellulosic fiber per door skin results in a reduction in the workload for the refiner used to refine the fiber in the range of 5% to 20% as compared to a door skin having a thickness of about 0.125 inches (3.175 mm).

18. The method of claim 16, wherein the reduction in lignocellulosic fiber per door skin results in a reduction in the amount of resin per door skin in the range of about 5% to 20% as compared to a door skin having a thickness of about 0.125 inches (3.175 mm).

19. The method of claim 16, wherein the reduction in lignocellulosic fiber per door skin results in a reduction in the weight per door skin in the range of about 5% to 20% as compared to a door skin having a thickness of about 0.125 inches (3.175 mm).

20. The method of claim 4, wherein the resin comprises a formaldehyde-based resin or an isocyanate-based resin.

21. The method of claim 4, wherein the mixture comprises a release agent that is an aqueous emulsion of surfactants and polymers distinct from the wax.

22. The method of claim 21, wherein the release agent is an internal release agent.

23. A method for making a molded thin-layer composite of reduced thickness comprising the steps of:
   forming a mixture comprising a refined lignocellulosic fiber, a resin, and a wax selected from the group consisting of paraffin wax, microcrystalline wax, shellac wax, ozokerite wax, montan wax, slack wax, emulsified waxes thereof, and combinations thereof;
   pre-pressing the mixture into a loose mat;
   coating at least one of two dies with an anti-bonding agent including fluorocarbons; and
   pressing the mat between the two dies at an elevated temperature and pressure and for sufficient time to form a thin-layer lignocellulosic composite comprising a thickness from about 0.063 inches (1.60 mm) to 0.115 inches (2.92 mm).

24. The method of claim 23, wherein the resin comprises a formaldehyde-based resin or an isocyanate-based resin.

25. The method of claim 23, wherein the mixture comprises an internal release agent that is an aqueous emulsion of surfactants and polymers distinct from the wax.

26. A method for making a door skin of reduced thickness comprising the steps of:
   forming a mixture comprising a refined lignocellulosic fiber, a resin, and a wax selected from the group consisting of paraffin wax, microcrystalline wax, shellac wax, ozokerite wax, montan wax, slack wax, emulsified waxes thereof, and combinations thereof;

pre-pressing the mixture into a loose mat;
coating at least one of two dies with an anti-bonding agent including fluorocarbons; and
pressing the mat between the two dies at an elevated temperature and pressure and for sufficient time to form a thin-layer lignocellulosic composite door skin comprising a thickness from about 0.063 inches (1.60 mm) to 0.115 inches (2.92 mm).

27. The method of claim 26, wherein the resin comprises a formaldehyde-based resin or an isocyanate-based resin.

28. The method of claim 26, wherein the mixture comprises an internal release agent that is an aqueous emulsion of surfactants and polymers distinct from the wax.

* * * * *